US011403245B2

(12) United States Patent
Jiang et al.

(10) Patent No.: US 11,403,245 B2
(45) Date of Patent: Aug. 2, 2022

(54) TERMINAL, TERMINAL PERIPHERAL, SIGNAL TRANSMISSION SYSTEM AND SIGNAL SENDING AND RECEIVING METHOD

(71) Applicant: ZTE Corporation, Shenzhen (CN)

(72) Inventors: Yixiang Jiang, Shenzhen (CN); Weisheng Lian, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/755,616

(22) PCT Filed: Oct. 12, 2018

(86) PCT No.: PCT/CN2018/110144
§ 371 (c)(1),
(2) Date: Jun. 10, 2020

(87) PCT Pub. No.: WO2019/072252
PCT Pub. Date: Apr. 18, 2019

(65) Prior Publication Data
US 2021/0200705 A1 Jul. 1, 2021

(30) Foreign Application Priority Data
Oct. 12, 2017 (CN) .......................... 201710948958.7

(51) Int. Cl.
G06F 13/38 (2006.01)
H04R 3/00 (2006.01)
(52) U.S. Cl.
CPC ............. G06F 13/385 (2013.01); H04R 3/00 (2013.01); G06F 2213/0016 (2013.01);
(Continued)

(58) Field of Classification Search
CPC ........... G06F 13/385; G06F 2213/3812; G06F 2213/0042; H04R 3/00; H04R 2420/03
See application file for complete search history.

(56) References Cited

U.S. PATENT DOCUMENTS

2006/0166627 A1* 7/2006 Crawley ................. H04L 7/033
455/76
2010/0054498 A1* 3/2010 Sollenberger ........ H03G 3/3026
381/104

(Continued)

FOREIGN PATENT DOCUMENTS

CN 201359725 Y 12/2009
CN 104063348 A 9/2014
(Continued)

OTHER PUBLICATIONS

TMS320C5515/14/05/04 DSP Inter-IC Sound (I2S) Bus User's Guide; Texas Instruments (Year: 2014).*
(Continued)

Primary Examiner — Idriss N Alrobaye
Assistant Examiner — Ronald T Modo
(74) Attorney, Agent, or Firm — Cantor Colburn LLP

(57) ABSTRACT

Provided are a terminal, a terminal peripheral, a signal transmission system, and a signal sending and receiving method. The terminal includes: a first audio module, which is connected to the USB receptacle in a terminal through an I2S bus channel and is configured to send a signal to be sent to a USB receptacle; the USB receptacle is configured to provide a physical connection interface between the terminal and a terminal peripheral.

15 Claims, 18 Drawing Sheets

(52) U.S. Cl.
CPC ............... *G06F 2213/0042* (2013.01); *G06F 2213/3812* (2013.01); *H04R 2420/03* (2013.01)

(56) References Cited

U.S. PATENT DOCUMENTS

| | | | |
|---|---|---|---|
| 2014/0172422 A1* | 6/2014 | Hefetz | G10L 19/0208 704/229 |
| 2016/0285757 A1* | 9/2016 | Srivastava | H04L 49/109 |
| 2017/0280244 A1* | 9/2017 | Scarlett | H04R 5/04 |
| 2018/0239718 A1* | 8/2018 | Jabori | G06F 13/4295 |
| 2019/0110119 A1* | 4/2019 | Yoshino | H04B 1/18 |

FOREIGN PATENT DOCUMENTS

| | | |
|---|---|---|
| CN | 105120404 A | 12/2015 |
| CN | 105677611 A | 6/2016 |
| CN | 106021150 A | 10/2016 |
| CN | 205987323 U | 2/2017 |
| CN | 106792313 A | 5/2017 |
| WO | 2017065769 | 4/2017 |

OTHER PUBLICATIONS

International Search Report for corresponding application PCT/CN2018/110144 filed Oct. 12, 2018; dated Jan. 16, 2019.
Chinese Search Report for corresponding application 2017109489587; dated Jun. 19, 2020.

* cited by examiner

Correspondence between receptacle pins and plug pins when reverse plug

USB Type-C Receptacle (Front View)

USB Type-C Plug (Front View)

FIG. 4b

TERMINAL, TERMINAL PERIPHERAL, SIGNAL TRANSMISSION SYSTEM AND SIGNAL SENDING AND RECEIVING METHOD

CROSS-REFERENCE TO RELATED APPLICATIONS

This is national stage application, filed under 35 U.S.C. 371, of international patent application No. PCT/CN2018/110144 filed on Oct. 12, 2018, which claims priority to a Chinese patent application No. 201710948958.7 filed on Oct. 12, 2017, contents of both of which are incorporated herein by reference in their entireties.

TECHNICAL FIELD

The present application relates to, but not limited to, the field of electronic devices, and in particular, to a terminal, a terminal peripheral, a signal transmission system, and a signal sending and receiving method.

BACKGROUND

At present, in an overall design of a terminal peripheral based on a Universal Serial Bus (USB) interface, signal interference, signal delay, and large power consumption often occur, for example, in an overall design of an earphone, large signal interference, call delay, and large overall power consumption often occur. For example, in a process of designing a USB Type-C earphone, it is found that a current USB Type-C pure digital earphone based on a USB Audio Class (UAC) technology can do nothing about too large call delay under a mobile network, and thereby failing to pass a communication test standard.

At present, the most common way is to design a USB Type-C earphone by using an analog-digital mixed manner, that is, a UAC technology is used when listening to music and analog signals of a conventional 3.5 mm earphone are routed to a USB Type-C interface when making a call. FIG. 1 shows a structure of an analog-digital mixed USB Type-C earphone.

This mixed manner earphone works as described below.

1. When the USB Type-C interface is connected to an analog earphone adapter and then has an earphone plugged in, the earphone is still an analog earphone, the signals are still easily interfered when listening music and making a call, and High Fidelity (HIFI) performance of the earphone cannot be reliably guaranteed. 2. When listening to music in a UAC manner, because a USB-inter IC sound (USB-I2S) bus bridge is used, audio signals are transmitted by using an I2S over USB technology, and audio signal stream performs data transmission through a USB physical channel. A USB interface is usually hung on an application (AP) processor, and when the USB is working, the AP cannot sleep, thereby resulting in relatively large power consumption. In addition, a host and the earphone need to perform bridge conversion from I2S to USB and from USB to I2S, and additional power consumption is also relatively large. The addition of the AP and the conversion bridge will significantly reduce battery life time of a mobile terminal, and user experience may be deteriorated.

3. USB enumeration delay exists in an analog and digital mode switching scenario, a user will perceive lags, and an overall experience effect of the user on the product will be reduced.

SUMMARY

Embodiments of the present application provide a terminal, a terminal peripheral, a signal transmission system and a signal sending and receiving method.

According to an embodiment of the present application, a terminal is provided. The terminal includes a first audio module and a USB receptacle. The first audio module is connected to the USB receptacle in a terminal through an audio bus channel and is configured to send a signal to be sent to the USB receptacle. The USB receptacle is configured to provide a physical connection interface between the terminal and a terminal peripheral.

According to another embodiment of the present application, a terminal peripheral is provided. The terminal peripheral includes a second audio module and USB plug. The second audio module is connected to a USB plug in a terminal peripheral through an audio bus channel and is configured to perform signal transmission with the USB plug through an I2S bus channel. The USB plug is configured to be connected to a USB receptacle of a terminal accessed by the terminal peripheral.

According to another embodiment of the present application, a signal transmission system is further provided. The signal transmission system includes any one of the above terminals and any one of the above terminal peripherals.

According to another embodiment of the present application, a signal sending method is further provided. The signal sending method includes a step described below. A terminal sends a signal to be sent to a USB receptacle in the terminal through a bus channel, and sends the signal to be sent to a terminal peripheral through the USB receptacle.

According to another embodiment of the present application, a signal receiving method is further provided. The signal receiving method includes a step described below. A terminal peripheral receives a signal from a terminal through a USB plug of the terminal peripheral, and sends, through an audio bus channel, the signal to a second audio module in the terminal peripheral.

BRIEF DESCRIPTION OF DRAWINGS

The drawings described herein are used to provide a further understanding of the present application and form a part of the present application. The exemplary embodiments and descriptions thereof in the present application are used to explain the present application and not to limit the present application in any improper way. Among the drawings:

FIG. 4B is a schematic diagram illustrating a correspondence between receptacle pins and plug pins when a peripheral is plugged in a reverse direction according to an embodiment of the present application;

DETAILED DESCRIPTION

Figure 1:
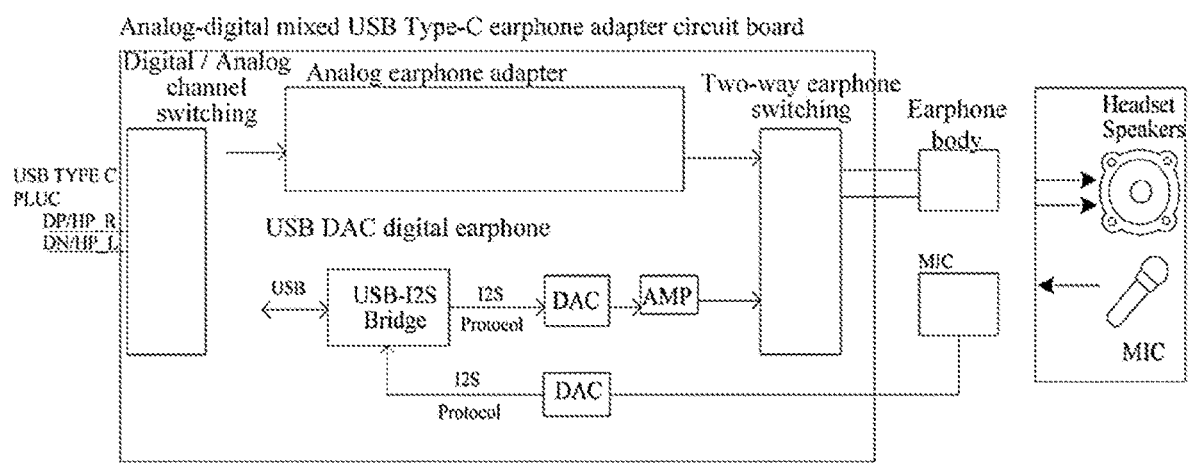
FIG. 1 is a schematic diagram of a structure of an analog-digital mixed USB Type-C earphone in the related art.

The present application will be described hereinafter in detail through embodiments with reference to the drawings. It is to be noted that if not in collision, the embodiments and features therein in the present application may be combined with each other.

It is to be noted that the terms "first", "second" and the like in the description, claims and drawings of the present application are used to distinguish between similar objects and are not necessarily used to describe a particular order or sequence.

For ease of understanding of the present application, the related technical terms involved in the embodiments of the present application are described below.

A terminal peripheral, i.e. an external device connected to a terminal, refers to a hardware device connected to an outside of a computer host, and has functions of transmitting, transferring and storing data and information.

An audio bus may be a bus for transmitting audio signals, and the audio bus includes, but is not limited to, an Inter-IC Sound (I2S) bus, also called an integrated circuit built-in audio bus. The audio bus may be configured to transmit data between audio devices, and it uses a design of transmitting clock and data signals via separate wires, thereby separating data and clock signals.

Signals may be transmitted in a digital manner.

Regarding the high power consumption caused by packing and unpacking of signals between USB and I2S in a terminal and a Type-C earphone, it is required to have relatively low power consumption and it is better not to use a USB adapter bridge manner, and in use, an application (AP) processor may be in a sleep state.

Regarding the mobile call time delay, the call time delay in a mobile communication network must meet requirements of communication specification, namely the call time delay is small.

Therefore, it is required to have following features: digital manner, low power consumption, and call time delay satisfying the requirements.

After researching the UAC protocol, it was found that the UAC earphone has delay and larger power consumption because the UAC architecture uses a USB-I2S bridge manner, in which an I2S OVER USB technology is used in audio signal transmission, and the audio signal flows through a USB physical channel.

The I2S OVER USB technology requires packing and unpacking of I2S format data to USB format data. This requirement will cause increased signal delay and power consumption, and the power consumption of the USB channel is relatively large. Based on this, in the embodiment of the present application, the process of packing and unpacking of the I2S data to the USB data is omitted, the signals are transmitted through the USB data channel to be naked over the USB Type-C.

Before the emergence of the UAC protocol, the USB interface had only two data buses, and the I2S had four data buses. I2S could not be crossed over the traditional USB interface. Therefore, I2S Over USB, a split-packing technique, must be used to make the I2S data to cross over the traditional USB interface. However, the emergence of the USB Type-C interface makes that the number of buses for transmitting audio data is not only two, but greater than four.

Further, since I2S is a low power consumption bus and low power consumption is a basic attribute, low power consumption is also a basic feature of the I2S Naked Over USB Type-C architecture.

Since the I2S is purely digital and audio signals between the host and the audio peripheral are transmitted by using the I2S, signal transmission of the I2S Naked Over USB Type-C architecture is also purely digital. Pure digitalization is also a basic feature of the I2S Naked Over USB Type-C architecture.

Since I2S itself is a common digital audio bus in a mobile communication platform, and is used for transmitting call audio data between a baseband processor and an audio CODEC inside the host, and the call delay is low, so the I2S Naked Over USB Type-C architecture is also a low time delay architecture.

In summary, the I2S Naked Over USB Type-C architecture has a series of following features to improve the performance of the UAC earphone and the analog-digital mixed USB Type-C earphone: 1) strong anti-interference capability because of pure digital; 2) low power consumption and long battery life; 3) small delay and the mobile communication satisfying requirements of the communication standard.

In the embodiments of the present application, the I2S bus is brought out from host system architecture, and is crossed over the USB Type-C interface to connect to an audio peripheral such as the earphone. The low power consumption audio bus is used for transmitting digital audio signals between the host and the peripheral. It should be noted that the above-mentioned architecture provided in the embodiment of the present application is not only applicable to transmitting audio signals, but also applicable to transmitting other signals that need to be interacted between a terminal and a terminal peripheral.

Figure 2:
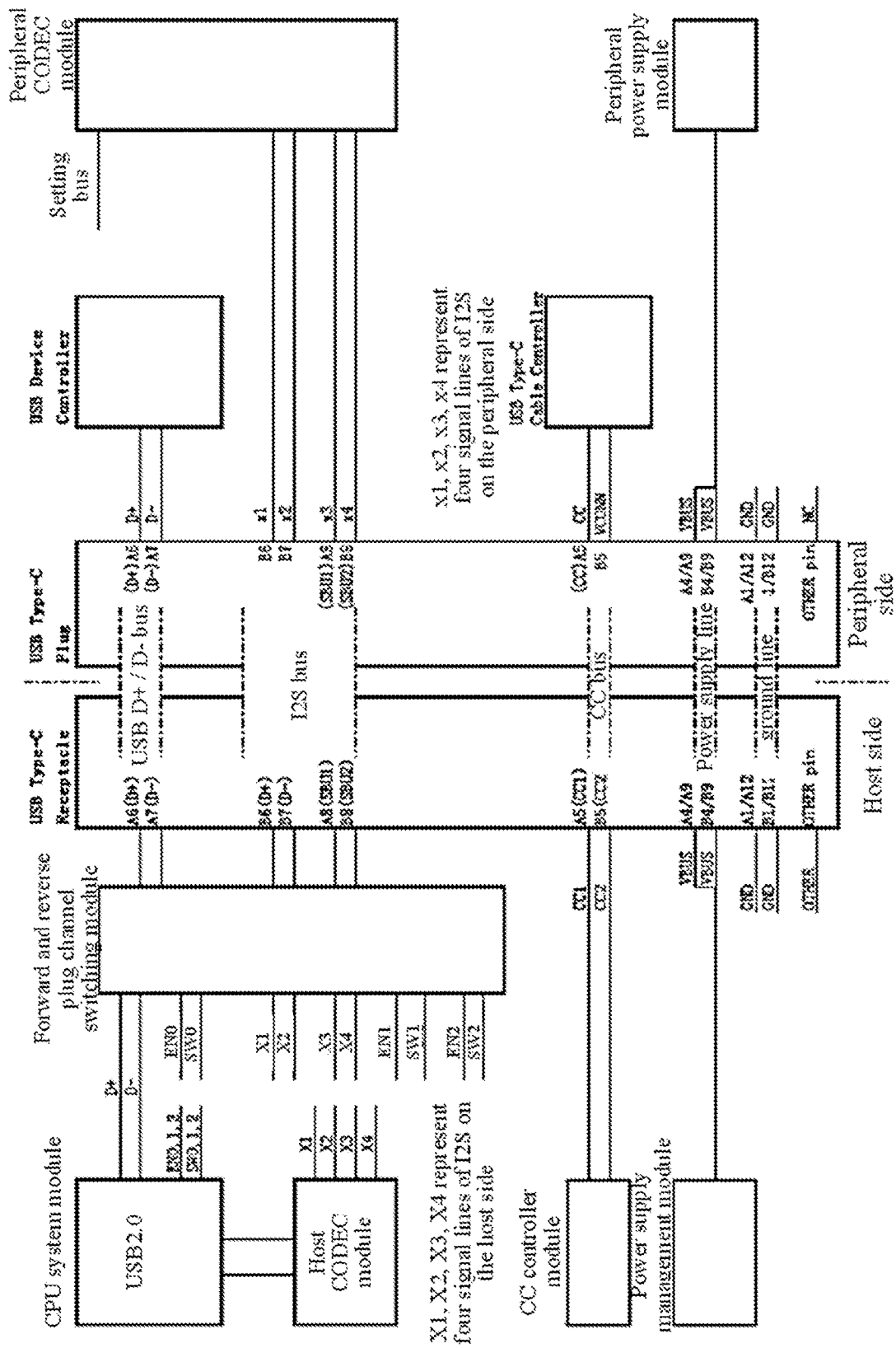
FIG. 2 is a schematic system diagram of an I2S naked over USB Type-C interface according to an embodiment of the present application.

The present embodiment provides a system of an I2S naked over USB Type-C interface. As shown in FIG. 2, the system includes: a host (also known as a terminal or a computer device), a terminal peripheral, and an audio bus (such as, I2S bus) channel between the host and the peripheral. In some embodiments, the audio bus may be a bus that transmits digital signals.

The host includes a CC controller module, a power management module, a forward and reverse plug channel switching module, a USB Type-C Receptacle, a CPU system module and a host CODEC module. In some embodiments, the CC controller module is configured to identify a forward and reverse plug connection state of the host through a CC bus. The system may also perform signal handshake interaction with a USB Type-C cable controller module on a peripheral side through the CC bus to complete acquisition of a peripheral label and initialization of the peripheral CODEC module. At this time, the CC controller must support and enables the USB PD protocol to read, through the CC bus, an electronically marked cable assembly (EMCA) peripheral electronic label in the USB Type-C cable controller module of the peripheral.

The power management module, which is responsible for host power management, must support a USB OTG function and is capable of supplying power to the peripheral.

The forward and reverse plug channel switching module is capable of routing an I2S physical signal line sent from the host CODEC module to a corresponding pin of the USB Type-C Receptacle.

The USB Type-C Receptacle is a physical connection interface between the host and the peripheral, and completes physical connection with a USB Type-C Plug of the peripheral.

The CPU system module, which includes an application processor, a baseband processor, a memory, a radio frequency transceiver and other hardware system platform chips, not only completes functions such as signal transceiving and conversion with a mobile network base station, but also is responsible for establishment control and signal interaction of a host I2S naked channel.

The host CODEC module, which includes an audio CODEC, an ADSP, a SPEAKER, a RECEIVER, an audio amplifier and the like, is used for performing signal interaction with the forward and reverse plug channel switching module through the I2S bus.

A peripheral side part includes a USB controller module, a USB Type-C cable controller module, a peripheral CODEC module, a peripheral power supply module, and a USB Type-C plug.

The signal interaction between the host and the peripheral includes: a USB2.0 bus, an I2S bus, a channel configuration CC bus, a power supply line, and a common ground line.

In some embodiments, the USB Device Controller module has a function of identifying basic information of the peripheral. The basic information includes: that this is a peripheral with the I2S bus over the USB Type-C; definition of channels and pins of the I2S bus over the USB Type-C; and a USB Device number and a product serial number.

The module may also be configured to perform signal handshake interaction with the CPU system module on the host side and report the peripheral identification information; and when connected to a setting bus of the peripheral CODEC module, complete initialization and register setting of the peripheral CODEC module.

The USB Type-C Cable Controller module has a function of identifying basic information of the peripheral. The information includes: that this is a peripheral with the I2S bus over the USB Type-C; definition of channels and pins of an audio bus (I2S) over the USB Type-C; and that the peripheral is a special EMCA.

The module may also be configured to perform signal handshake interaction with the CC controller module on the host side and report the peripheral identification information; and when connected to the setting bus of the peripheral CODEC module, complete initialization and register setting of the peripheral CODEC module.

The peripheral CODEC module, which includes an audio CODEC, a microphone DAC, an audio amplifier, a human interface device (HID), a SPEAKER, a microphone and the like, is used for transmitting digital audio signals with the USB Type-C Plug through the I2S bus.

The peripheral power supply module acquires a power supply from the VBUS or VCONN pin of the USB Type-C Plug, converts the power supply into voltage required by each module on the peripheral side, and manages a power-on sequence.

The USB Type-C Plug, as a physical connection interface between the peripheral and the host, completes a function of plugging and unplugging from the USB Type-C Receptacle of the host.

Figure 3A:
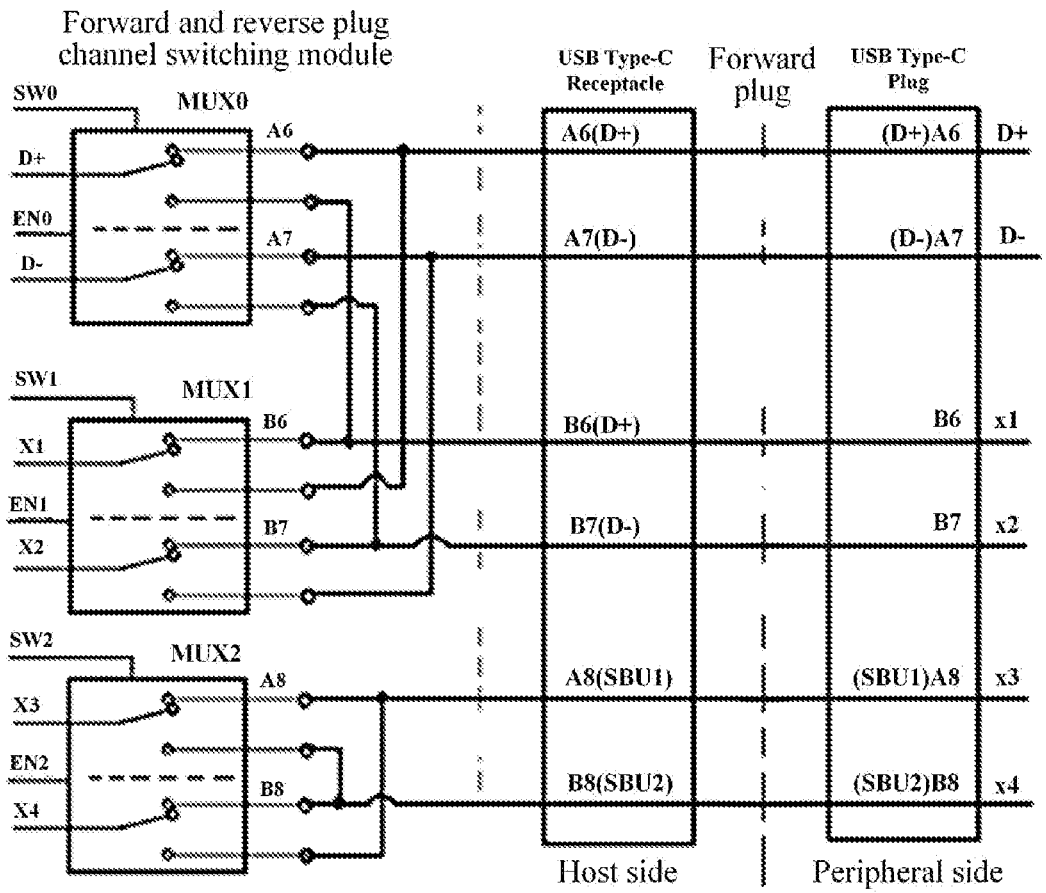
FIG. 3A is a schematic diagram illustrating establishment of an I2S channel and a USB channel when a peripheral is plugged in a forward direction according to an embodiment of the present application.
Figure 3B:
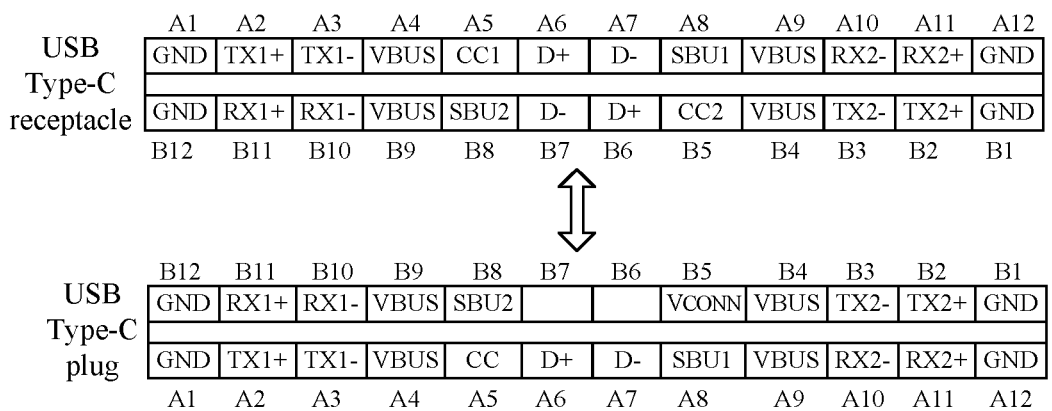
FIG. 3B is a schematic diagram illustrating a correspondence between receptacle pins and plug pins when a peripheral is plugged in a forward direction according to an embodiment of the present application.
Figure 4A:
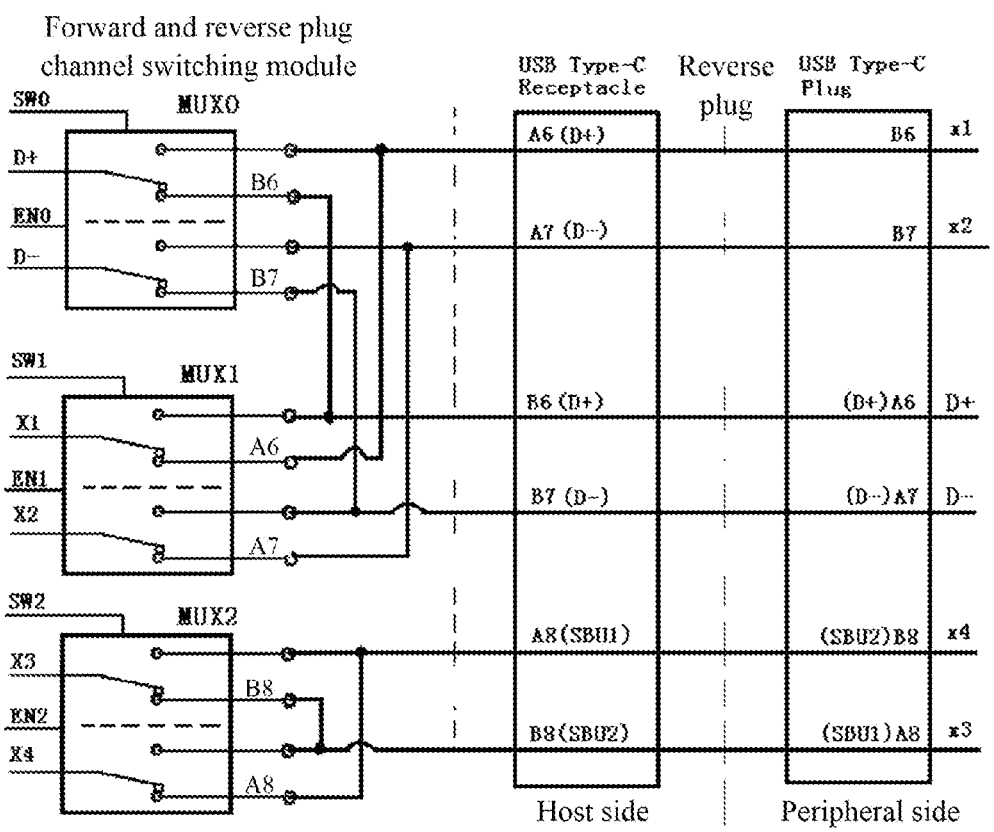
FIG. 4A is a schematic diagram illustrating establishment of an I2S channel and a USB channel when a peripheral is plugged in a reverse direction according to an embodiment of the present application.

How are the I2S signals among the interaction signals between the host and the peripheral crossed over the USB Type-C interface? As shown in FIG. 2, x1, x2, x3, x4 represent four signal lines of I2S on the peripheral side; X1, X2, X3, X4 represent four signal lines of I2S on the host side; and four signal lines of I2S are serial bit clock SCLK, frame clock LRCK, serial out data SDATA_O, serial in data SDATA_I respectively. To make I2S to cross over the USB Type-C interface, the four signals x1, x2, x3 and x4 of I2S are crossed over the USB Type-C interface and the forward and reverse plug channel switching module from the B6, B7, A8 and B8 pins of the USB Type-C Plug on the peripheral side and sent to X1, X2, X3 and X4 on the host side. The circuit principle of I2S channel establishment is shown in FIG. 3A, FIG. 3B, FIG. 4A and FIG. 4B. As shown in FIG. 3A, X1, X2, X3 and X4 represent that, when the four signal lines of I2S on the host side are plugged in the forward direction, three switches SW0, SW1 and SW2 are simultaneously thrown upward, and x1, x2, x3 and x4 represent four signal lines of I2S on the peripheral side. It should be noted that the forward and reverse plug channel switching module is formed by three two-way single-pole double-throw switches MUX0, MUX1 and MUX2, and the two-way single-pole double-throw switch includes a switch control signal SW and a channel on-off enable signal EN. The corresponding relationship between the plug and the receptacle when plugged in the forward direction is shown in FIG. 3B. As shown in FIG. 4A, X1, X2, X3 and X4 represent that, when the four signal lines of I2S on the host side are plugged in the reverse direction, three switches SW0, SW1 and SW2 are simultaneously thrown downward, and X1, X2, X3 and X4 represent four signal lines of I2S on the peripheral side.

The USB Type-C interface supports forward plug and reverse plug. The CC controller monitors forward plug and reverse plug and reports to the CPU system module. An instruction for forward and reverse plug channel switching is issued by the CPU system module and is executed through controlling 3 switch control lines SW0, SW1 and SW2 to be simultaneously thrown upwards or downwards.

A channel configuration (CC) bus among the interaction signals between the host and the peripheral is used for completing identification of a forward and reverse plug connection state of the host. When the USB Type-C Cable Controller is used as a device controller, the CC bus is also used as an interaction bus between the host and the peripheral to complete the identification of the forward and reverse data line is used as the interaction bus between the host and the peripheral to complete the device identification, the control setting of the audio module, and the like.

The power supply line and the ground line among the interaction signals between the host and the peripheral are used for completing power transmission between the host and the peripheral, and providing a signal mirror loop of the USB, I2S and CC buses.

Table 1 shows a USB Type-C host state identification table. With the "USB Type-C host connection state identification table", the host determines whether the UFP or the Power Cable is connected by sensing resistance of two CC pins, and determines forward and reverse plug, Debug Access Mode connected, or Audio Accessory Mode connected. DFP is an abbreviation of Downstream Facing Port, which represents a downlink Port, and may be referred to as a host CC controller herein, and UFP is an abbreviation of Upstream Facing Port, which represents an uplink Port, and may be referred to as a device control module on the peripheral side herein.

TABLE 1

Figure 5A:
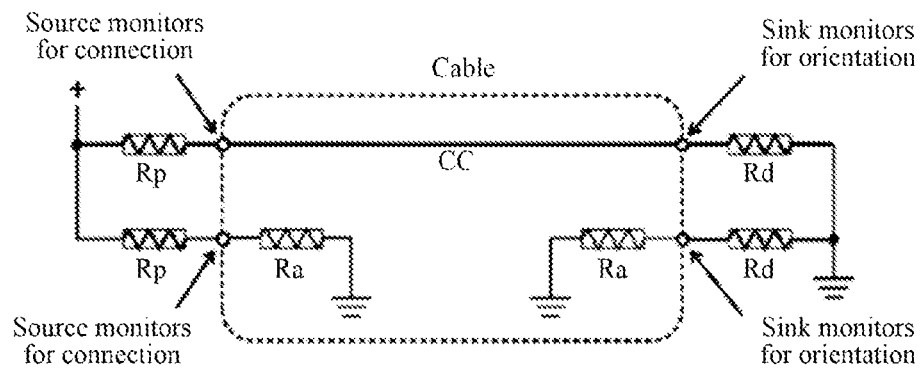
FIG. 5A is a schematic circuit diagram of a CC module according to an embodiment of the present application.
Figure 5B:
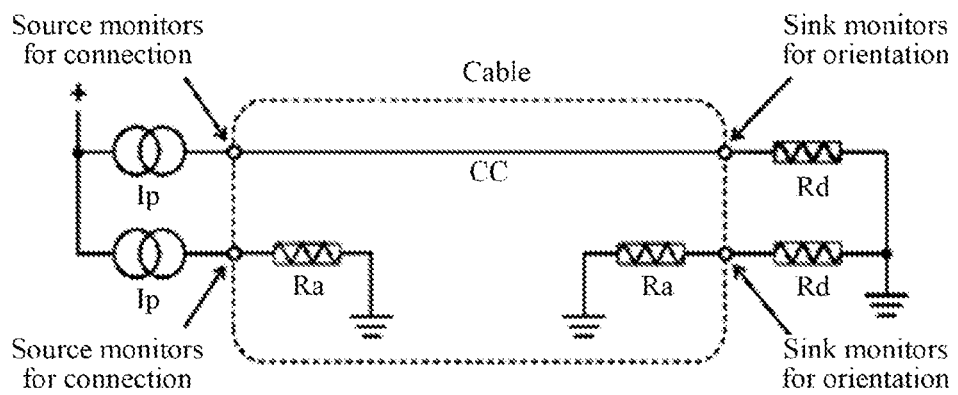
FIG. 5B is a schematic circuit diagram of another CC module according to an embodiment of the present application.

| Number | CC1 | CC2 | State | Position | Dp and Dn positions of plug |
|---|---|---|---|---|---|
| 1 | OPEN | OPEN | Nothing connected | N/A (Unplug) | / |
| 2 | Rd | OPEN | UFP connected | 1 (Forward plug) | Dp, A6 |
| 3 | OPEN | Rd |  | 2 (Reverse plug) | Dn, A7 |
| 4 | OPEN | Ra | Powered Cable/No UFP connected | 1 (Forward plug) | Dp, A6 |
| 5 | Ra | OPEN |  | 2 (Reverse plug) | Dn, A7 |
| 6 | Rd | Ra | Powered Cable/UFP connected | 1 (Forward plug) | Dp, A6 |
| 7 | Ra | Rd |  | 2 (Reverse plug) | Dn, A7 |
| 8 | Rd | Rd | Debug Accessory Mode connected (Appendix B) | N/A (Fail to identify forward or reverse plug) | Dp, A6, B6 Dn, A7, B7 |
| 9 | Ra | Ra | Audio Adapter Accessory Mode connected (Appendix B) | N/A (Fail to identify forward or reverse plug) | Dp, A6, and B6 are shorted Dn, A7, and B7 are shorted | plug connection state of the host and CC behavior, such as device identification and control setting of the audio module, as shown in FIG. 5A and FIG. 5B. FIG. 5A and FIG. 5B are taken from "USB Type-C Cable and Connector Specification Release 1.2", Mar. 25, 2016. To define the CC behavior, two resistors, Rp and Rd, are introduced. Variations are possible in an actual device, for example, Rp may be replaced by a current source. In an initial situation, a DFP CC end has Rp pull-up, and a UFP CC end has Rd pull-down; the Vconn pin in the Power Cable has Ra pull-down (in some cases a pure resistor, and in some cases a load); the DFP needs to be capable of identifying Rd and Ra, that is, the DFP determines a connection of UFP or a Power Cable and CC direction by identifying Rd and Ra; the UFP determines a plug direction by a voltage (CC when the voltage exceeds 0V) of two CC pins.

For a USB2.0 data line among the interaction signals between host and peripheral, when the USB Device Controller is used as the device controller, the USB2.0 D+/D−

An interaction flow between the host and the peripheral includes steps described below.

The interaction between the host and the peripheral may be performed in two manners: a CC bus interaction manner and a USB bus interaction manner.

Figure 6:
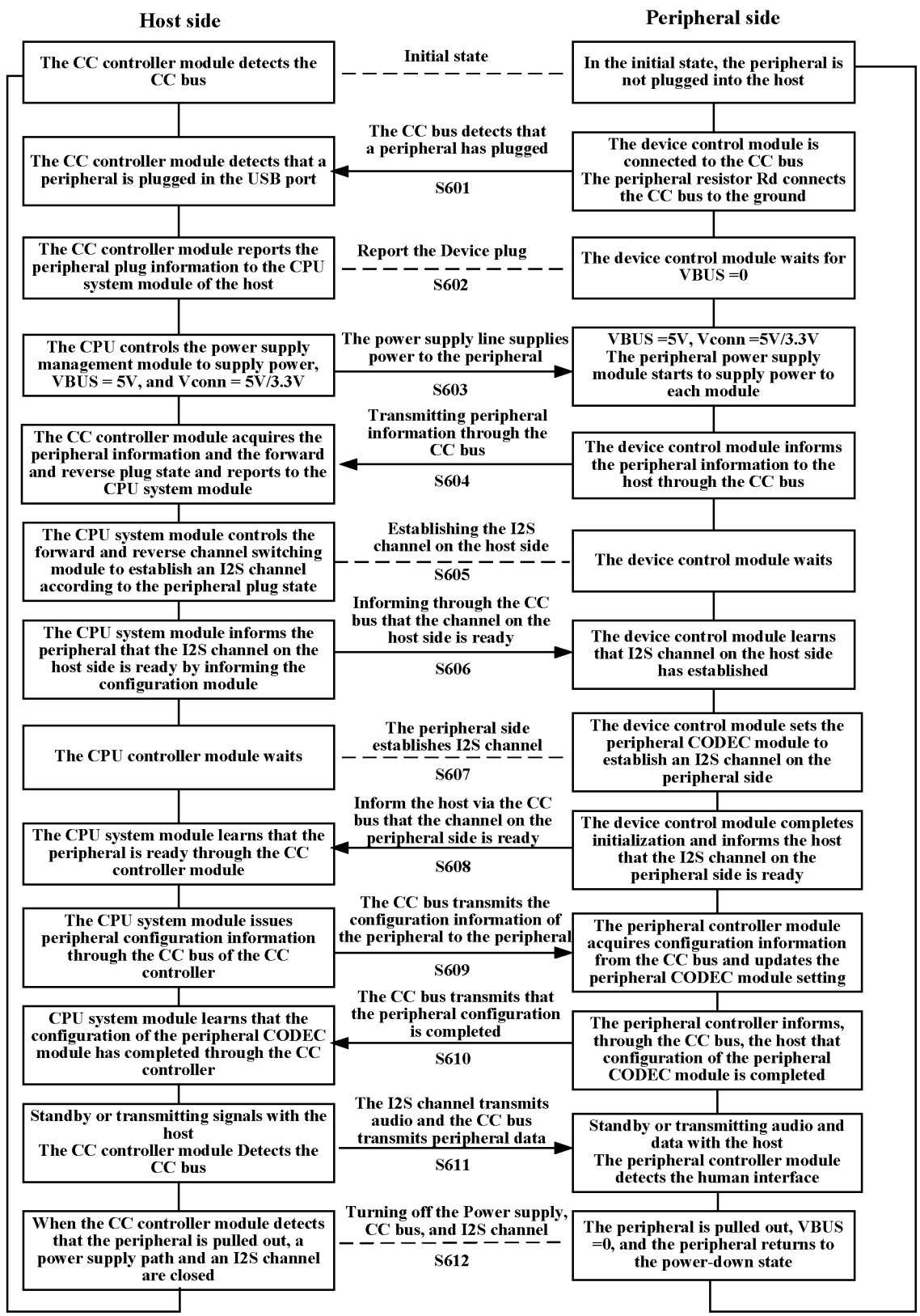
FIG. 6 is a flowchart of interaction of a host and a peripheral in a CC bus interaction manner according to an embodiment of the present application.

In the CC bus interaction manner, the USB Type-C Cable Controller on the peripheral side is used as a device controller, is externally connected to the CC bus, and internally controls the peripheral CODEC module through a control bus I2C, SPI, GPIO or the like. The specific flow is shown in FIG. 6.

Figure 7:
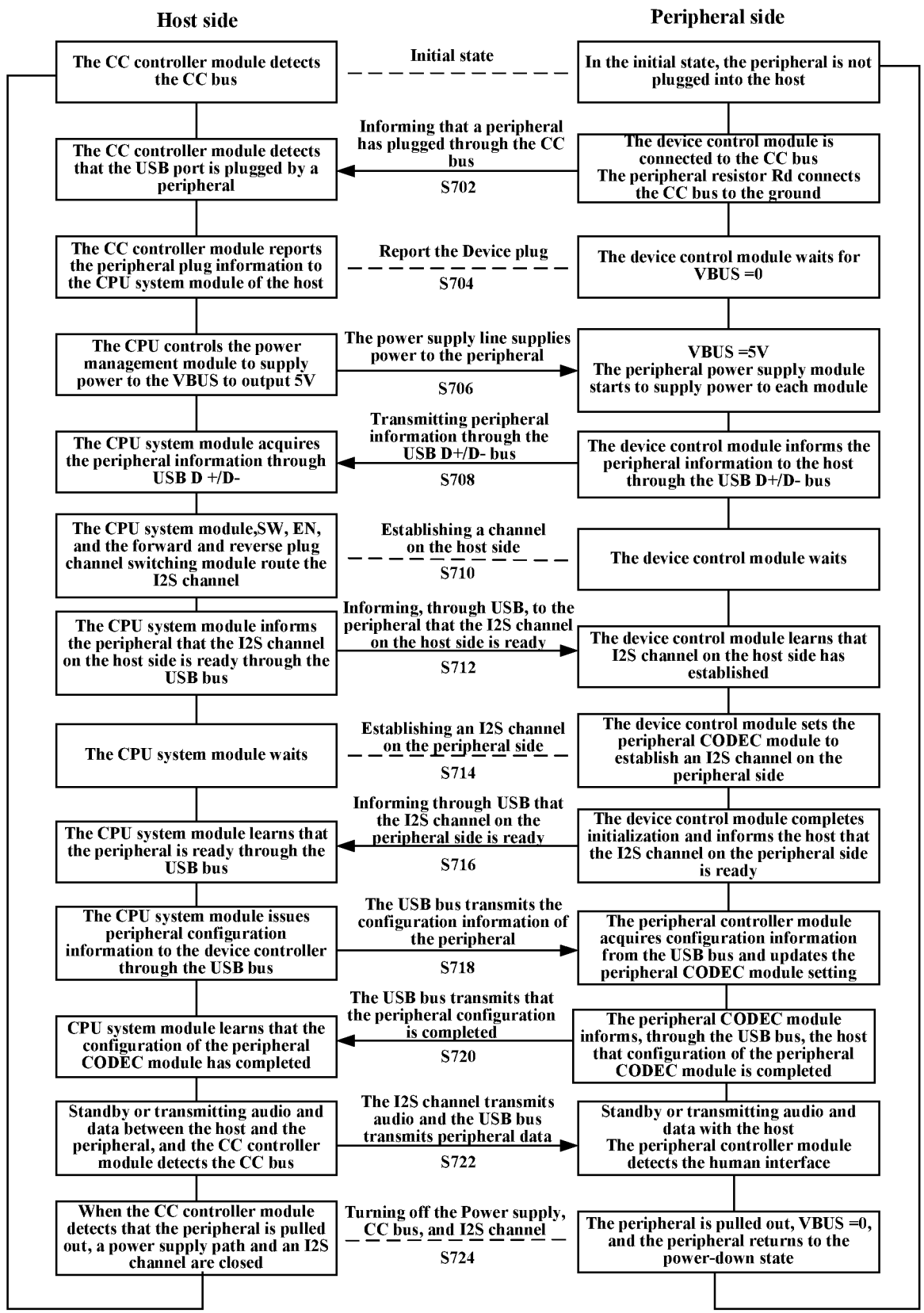
FIG. 7 is a flowchart of interaction of a terminal peripheral and a terminal in a USB bus interaction manner according to an embodiment of the present application.

In the USB bus interaction manner, the USB Device Controller on the peripheral side is used as the device controller, is externally connected to a USB D+/D− bus of the USB Type-C Plug, and is internally connected to the control bus I2C, SPI, GPIO or the like of the peripheral CODEC module. The specific process is shown in FIG. 7.

Based on the above, the I2S Naked Over USB Type-C architecture can address poor anti-interference capability, high power consumption, and large delay in the UAC earphone and analog-digital mixed USB Type-C earphone. Because the pure digital signal transmission can be used, the anti-interference capability is strong; because the I2S bus is a low power consumption bus, the battery life is long; and the I2S bus is a commonly used digital audio bus in the mobile communication platform and is used for transmitting call audio data between a baseband processor and an audio CODEC in the host, the call delay is low and the delay is small, which meets requirements of mobile call.

Figure 8:
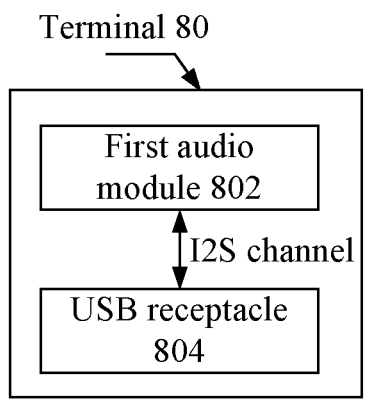
FIG. 8 is a structural diagram of a terminal according to an embodiment of the present application.

The present embodiment provides a terminal, which is connected to a terminal peripheral connected to the terminal through an I2S bus channel. As shown in FIG. 8, the terminal 80 includes a first audio module 802 and a USB receptacle 804.

The first audio module 802 is connected to USB receptacle in a terminal through an audio bus channel and is configured to send a signal to be sent to the USB receptacle. In some embodiments, the first audio module 802 may be an audio CODEC, a MIC DAC, an earphone DAC, an earphone amplifier, an earphone wire control identification circuit, an encoder, and the like in the terminal.

The USB receptacle 804 is configured to provide a physical connection interface between the terminal and a terminal peripheral.

Figure 9:
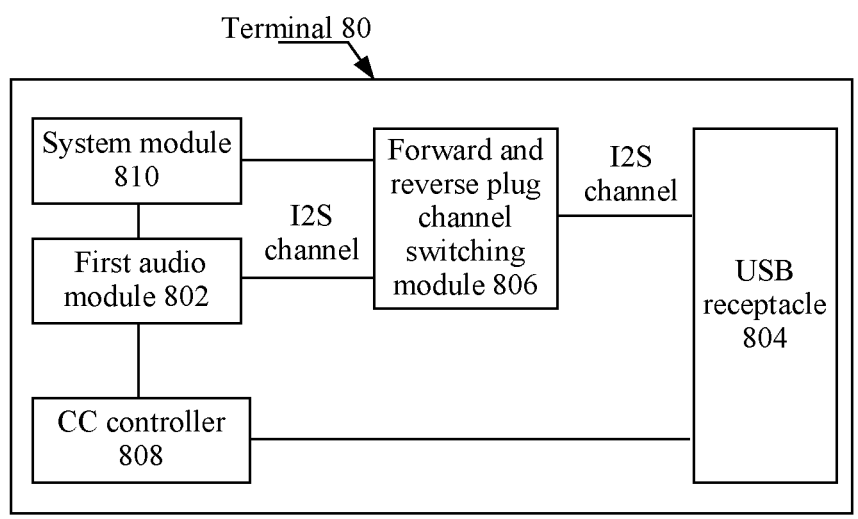
FIG. 9 is a structural diagram of a terminal according to an embodiment of the present application.

In an embodiment, the USB receptacle is a USB Type-C receptacle, and in this case, as shown in FIG. 9, the terminal further includes a forward and reverse plug channel switching module 806 which is disposed on an audio bus (such as I2S bus) and separately connected to the first audio module and the USB receptacle through the audio bus (such as I2S bus).

In some embodiments, as shown in FIG. 9, the terminal may further include a Channel Configuration (CC) controller 808. The CC controller 808 is configured to identify a forward and reverse plug connection state when the terminal peripheral is connected to the terminal and notify the above-mentioned forward and reverse plug connection state to the system module 810 used for performing information interaction with the network side.

The system module 810 is separately connected to the first audio module 802 and the forward and reverse plug channel switching module 806, and is configured to control the forward and reverse plug channel switching module 806 to establish an audio bus (such as I2S bus) channel according to the forward and reverse plug connection state. In some embodiments, the system module 810 may include, but is not limited to an application processor, a baseband processor, a memory, a radio frequency transceiver and other hardware system platform chips. The system module 810 completes functions such as signal transceiving conversion with a mobile network base station and is also responsible for completing establishment control and signal interaction of a host audio naked channel.

In some embodiments, the audio bus is an I2S bus. An I2S bus in an I2S bus channel is crossed over the forward and reverse plug channel switching module and is connected to pins B6, B7, A8 and B8 in a USB Type-C receptacle. The I2S bus includes the following signal lines: serial bit clock SCLK, frame clock LRCK, serial out data SDATA_O, and serial in data SDATA_I.

Figure 10:
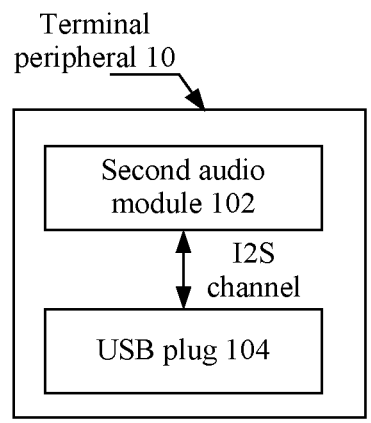
FIG. 10 is a structural diagram of a terminal peripheral according to an embodiment of the present application.

The present embodiment further provides a terminal peripheral. As shown in FIG. 10, the terminal peripheral 10 includes a second audio module 102 and a USB plug 104.

The second audio module is connected to a USB plug in a terminal peripheral through an I2S bus channel and is configured to perform signal transmission with the USB plug through the audio bus channel.

The USB plug is configured to be connected to a USB receptacle of a terminal accessed by the terminal peripheral.

Figure 11:
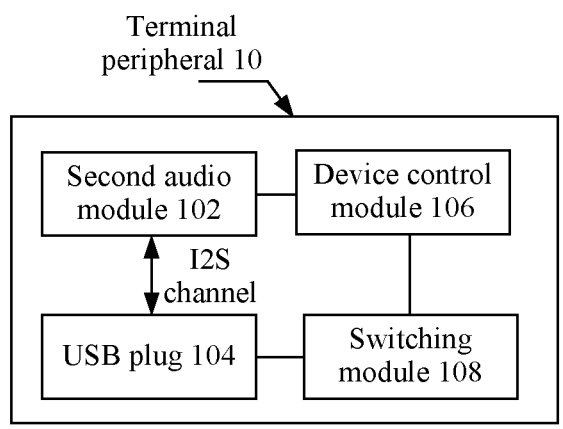
FIG. 11 is a structural diagram of another terminal peripheral according to an embodiment of the present application.

In some embodiments, the USB plug 104 is a USB Type-C plug. In this case, as shown in FIG. 11, the terminal peripheral 10 may further include a device control module 106.

The device control module 106 is connected to the USB Type-C plug 104 and used for maintaining description information of the terminal peripheral, where the description information includes at least one of: identification information used for identifying that the terminal peripheral supports a connection of the second audio module to the USB Type-C plug through an I2S channel; or a mapping relationship between an I2S bus in the I2S bus channel and pins of the USB Type-C plug.

In some embodiments, the device control module 106 is further configured to be connected to the second audio module through the I2C bus and used for initializing configuration of the second audio module.

In some embodiments, the device control module 106 is further configured to control the second audio module to establish the I2S bus channel and send first notification information to the terminal, and the first notification information is used for notifying the terminal that the terminal peripheral has established the audio bus (such as I2S bus) channel.

In some embodiments, the device control module 106 is further configured to receive second notification information sent by the terminal, and the second notification information is used for notifying the terminal peripheral that the terminal has established the audio bus (such as I2S bus) channel.

In some embodiments, an I2S in the I2S bus channel is connected to pins B6, B7, A8 and B8 of the USB Type-C plug; or the I2S is connected to pins A6, A7, A8 and B8 of the USB Type-C plug; or the I2S is connected to pins A6, A7, B6 and B7 of the USB Type-C plug. The I2S includes the following signal lines: serial bit clock SCLK, frame clock LRCK, serial out data SDATA_O, and serial in data SDATA_I.

In an embodiment, as shown in FIG. 11, the terminal peripheral may further include a switching module 108. The switching module 108 is configured to conduct the I2S bus channel when the terminal supports a first working mode, and close the I2S bus channel and open a USB channel between the second audio module and the USB plug when the terminal supports a second working mode, the USB channel includes a USB-to-I2S bridge circuit, where in the first working mode, a first audio module in the terminal is connected to a USB receptacle through the I2S bus channel, and in the second working mode, the first audio module is connected to the USB receptacle through the USB channel.

Taking the earphone as an example, for different working modes of the terminal, correspondingly, the terminal peripheral may also be divided into a single-mode digital earphone and a dual-mode digital earphone, which are explained in detail below. According to difference of a device controller and a control bus on the peripheral side, two implementations of the I2S over a USB Type-C interface are provided. In one implementation, the USB Type-C Cable Controller is used as a device controller to design a single-mode digital earphone with the I2S over the USB Type-C interface, and in the other implementation, the USB Device Controller as a device controller to provide a dual-mode digital earphone with the I2S over the USB Type-C interface.

1. Single-Mode Digital Earphone

The single-mode digital earphone with the I2S over the USB Type-C interface is an audio peripheral based on the I2S Naked Over USB Type-C architecture. An earphone with the I2S over the USB Type-C interface (referred to as I2S USBC earphone) is taken as an example for description.

The I2S USBC earphone has the following features: transmitting the audio signals to the host through the I2S; transmitting the control signals to the host through the CC bus; transmitting operation information of earphone wire control keys (volume increase and decrease, connect and hang up, pause, fast forward, and other functions) to the host through the CC; and the I2S data line using B6/B7/A8/B8 pins of the USB Type-C Plug.

Figure 12:
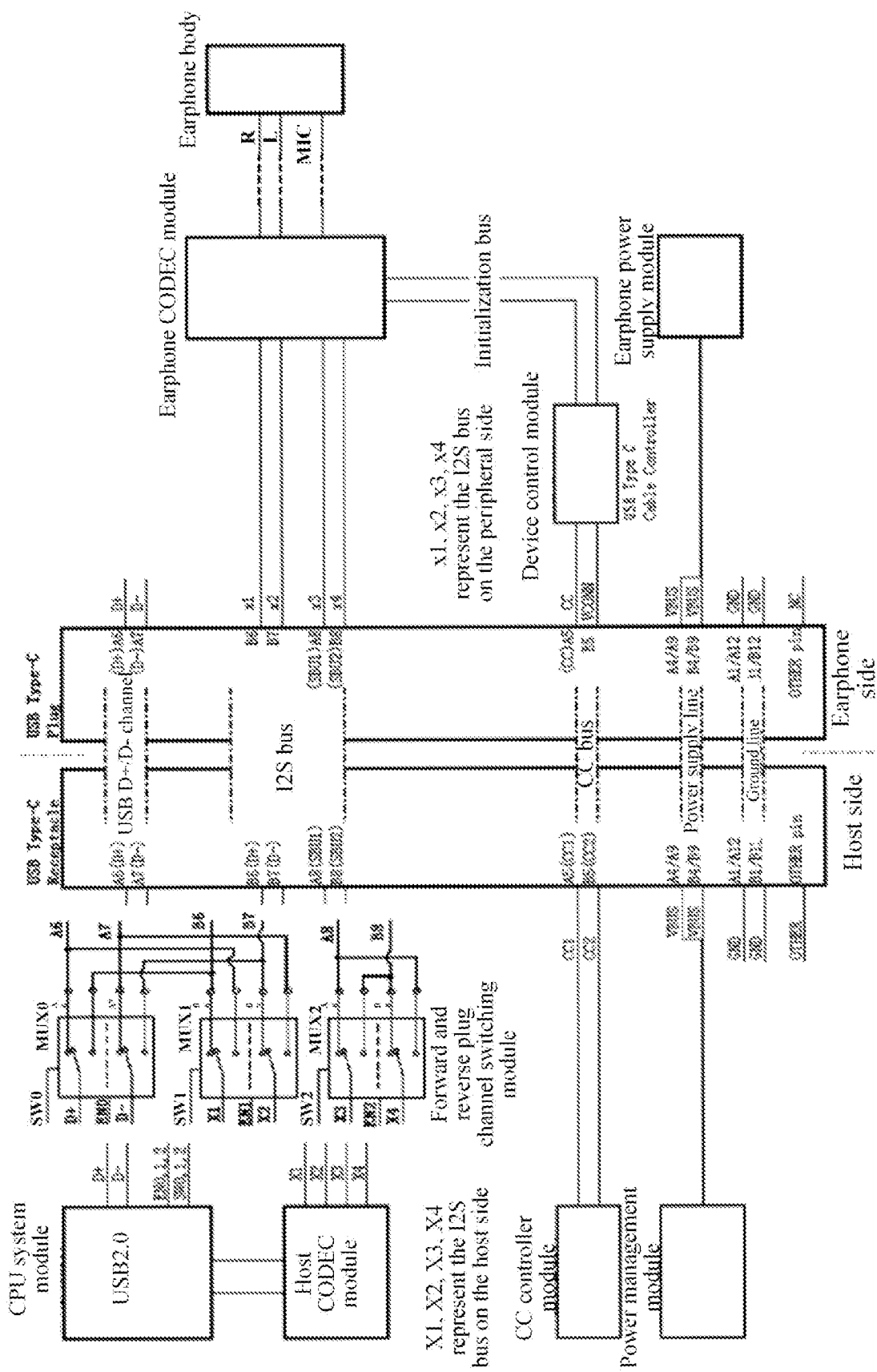
FIG. 12 is an architecture diagram of a single-mode digital earphone with I2S over a USB Type-C interface according to an embodiment of the present application.

An implementation block diagram of the I2S USBC earphone is shown in FIG. 12. As shown in FIG. 12, architecture of the I2S USBC earphone is formed by an earphone, a host, and interaction signals between the host and the earphone. The I2S is directly crossed over the USB Type-C interface to transmit the audio signals. The control signals and data signals are transmitted through the CC bus.

An earphone side part includes a device control module, an earphone CODEC module, an earphone power supply module, an earphone USB Type-C Plug and an earphone body.

A host side part not only includes a CPU system module and a host CODEC module, but also must include a CC controller module, a power supply management module, a forward and reverse plug channel switching module and a USB Receptacle.

Interaction signals between the host and the earphone include the I2S bus, the CC bus, a power supply line, and a common ground line.

Functions of modules of the I2S USBC earphone are described below.

1) Device Control Module

The device controller module uses a USB Type-C Cable Controller form, and the device is identified as a special EMCA electronically marked cable. The device control module has a function of identifying basic information of the I2S USBC earphone and the basic information includes that the earphone is an I2S bus USB Type-C interface earphone and that the I2S is defined at pins B6/B7/A8/B8. The device controller module communicates with the CC controller module on the host side by using a CC single bus to complete report of the earphone identification information. The device controller module communicates with the earphone Audio module by using the I2C bus as an initialization bus to complete initialization of the earphone CODEC module. Power is supplied between the device control module and the CC controller module on the host side through the VCONN.

EMCA, also referred to Electronically Marked Cable Assembly, is part of USB PD. EMCA conforms to the "SOP'/SOP" Communication with Cable Plugs" specification in the USB PD protocol. The USB PD is a Bi-Phase Mark (BMC) code signal, and the previous USB is Frequency-shift Keying (FSK); the USB PD is transmitted on the CC pins, and the USB PD has a Vector Defined Messages (VDM) function, which defines a device ID for defining an earphone label and can also define a register mapping table of the earphone CODEC module. The host can set the register of the earphone CODEC module through the register mapping table.

2) Earphone CODEC Module

The earphone CODEC module includes an audio CODEC, an MIC DAC, an earphone DAC, an earphone amplifier, earphone wire control identification and code, and the like, and has an I2C interface and an I2S interface, where the I2S interface is directly connected to B6/B7/A8/B8 pins of the USB Type-C Plug.

3) Earphone Power Supply Module

The earphone power supply module acquires power from VBUS of the USB Type-C Plug, converts the power into voltages required by each module on the earphone side, and manages a power-on sequence.

3) Earphone Body

The earphone body includes an earphone horn, an MIC, wire control keys, an earphone cable and the like, that is all parts of a traditional 3.5 mm earphone except a plug.

Figure 13:
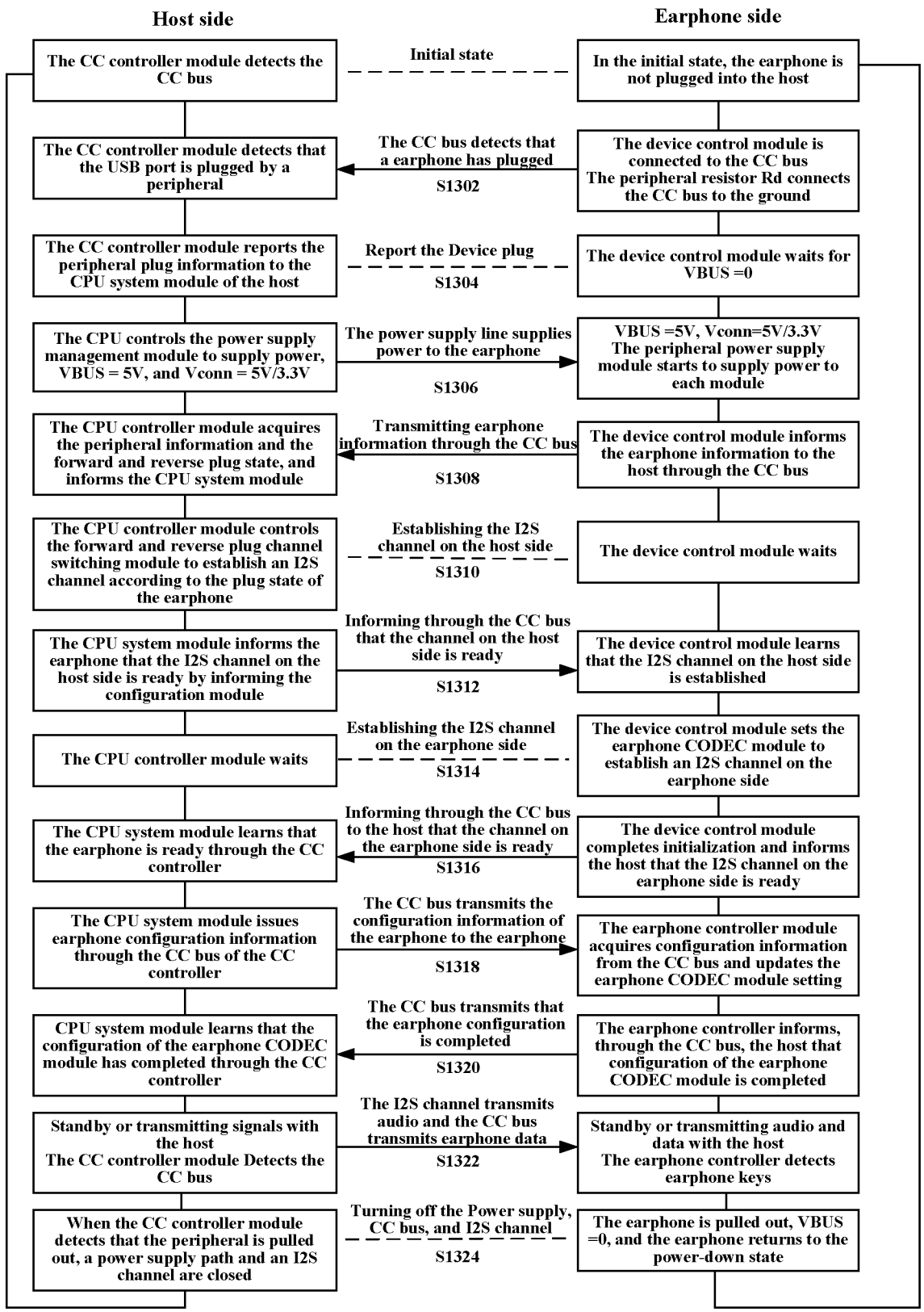
FIG. 13 is a flowchart of interaction of an earphone and a host through a CC bus according to an embodiment of the present application.

An interaction flow between the I2S USBC earphone and the host is shown in FIG. 13.

Technical effects of the I2S USBC earphone are as follows.

1) As for the I2S USBC earphone, power consumption is low, and an I2S low power consumption digital audio bus is used for signal transmission; compared with UAC, power consumption waste of I2S to USB and USB to I2S and power consumption waste in a case that the AP cannot sleep when the USB works are further saved.

2) As for the I2S USBC earphone, the cost is low. On the earphone side, a USB-I2S bridge conversion chip is not needed; compared with the analog-digital mixed earphone, a rear-stage circuit does not need to be added with a two-way earphone switching chip; compared with the analog-digital mixed earphone with time division multiplexing channels, a front-stage USB of a USB port and an earphone signal switch are further saved.

3) HIFI performance of the I2S USBC earphone is more guaranteed. Firstly, the pure digital signals are not easily interfered; and secondly, compared with the analog-digital mixed earphone, the rear-stage circuit does not need to be added with the two-way earphone switch, so that insertion loss of the audio signal caused by the switch is avoided. Compared with the analog-digital mixed earphone with time division multiplexing channels, the USB and the earphone signal switch are further saved, thereby further avoiding audio signal insertion loss caused by the switch.

4) The I2S USBC earphone can completely meet the requirement of the mobile call time delay. An audio channel is completely the same as a traditional mobile phone, and natural call delay is the same as the traditional mobile phone.

5) In the I2S USBC earphone, traditional audio architecture is used in software, the earphone development difficulty is relatively lower, a full digitalization process of the earphone is more advanced, and the product is easier to seize market opportunities. The design of the digital earphone which completely meets the requirement of the mobile call time delay under the UAC architecture needs to wait for improvement of the UAC standard and optimization of a host hardware platform and software architecture, and can be realized in the future.

2. Dual-Mode Digital Earphone

The USB Device Controller on the peripheral side is used as a device control module, externally uses the USB D+/D− bus as an interaction bus to connect to the USB Type-C Plug, internally is connected to the peripheral CODEC module through an control bus such as I2C, SPI, GPIO, or the like. In another embodiment, another I2S Naked Over USB Type-C interface digital audio peripheral architecture of the I2S Over USB Type-C interface can be designed. Since some USB Device controllers have a U2S-I2S bridge function, it is easy to design an audio peripheral which supports not only an I2S Naked Over USB Type-C interface architecture, but also the UAC function. Here, an earphone peripheral is still used as an example for description, that is in a dual-mode digital earphone, mode 1 is I2S Naked Over USB Type-C architecture and mode 2 is UAC architecture based on I2S Over USB technology. For simplicity, hereinafter the earphone referred to as an I2S & UAC dual-mode earphone.

The I2S & UAC dual-mode earphone has features described below. The earphone has a UAC digital earphone function. The earphone has an I2S USBC digital earphone function. The earphone has two working mode, a UAC mode and an I2S USBC mode, and the I2S USBC mode has priority.

In the UAC mode, the earphone transmits control signals, audio signals and data signals with the host through the USB bus.

In the I2S USBC mode, the earphone transmits audio signals with the host through the I2S bus, and transmits control signals and human interface interaction signals (wire control keys for volume increase and decrease, call, pause, and the like) through the USB D+/D− bus.

The I2S data line uses B6/B7/A8/B8 pins of the USB Type-C Plug.

A device label is implemented through a USB Device label manner.

Figure 14:
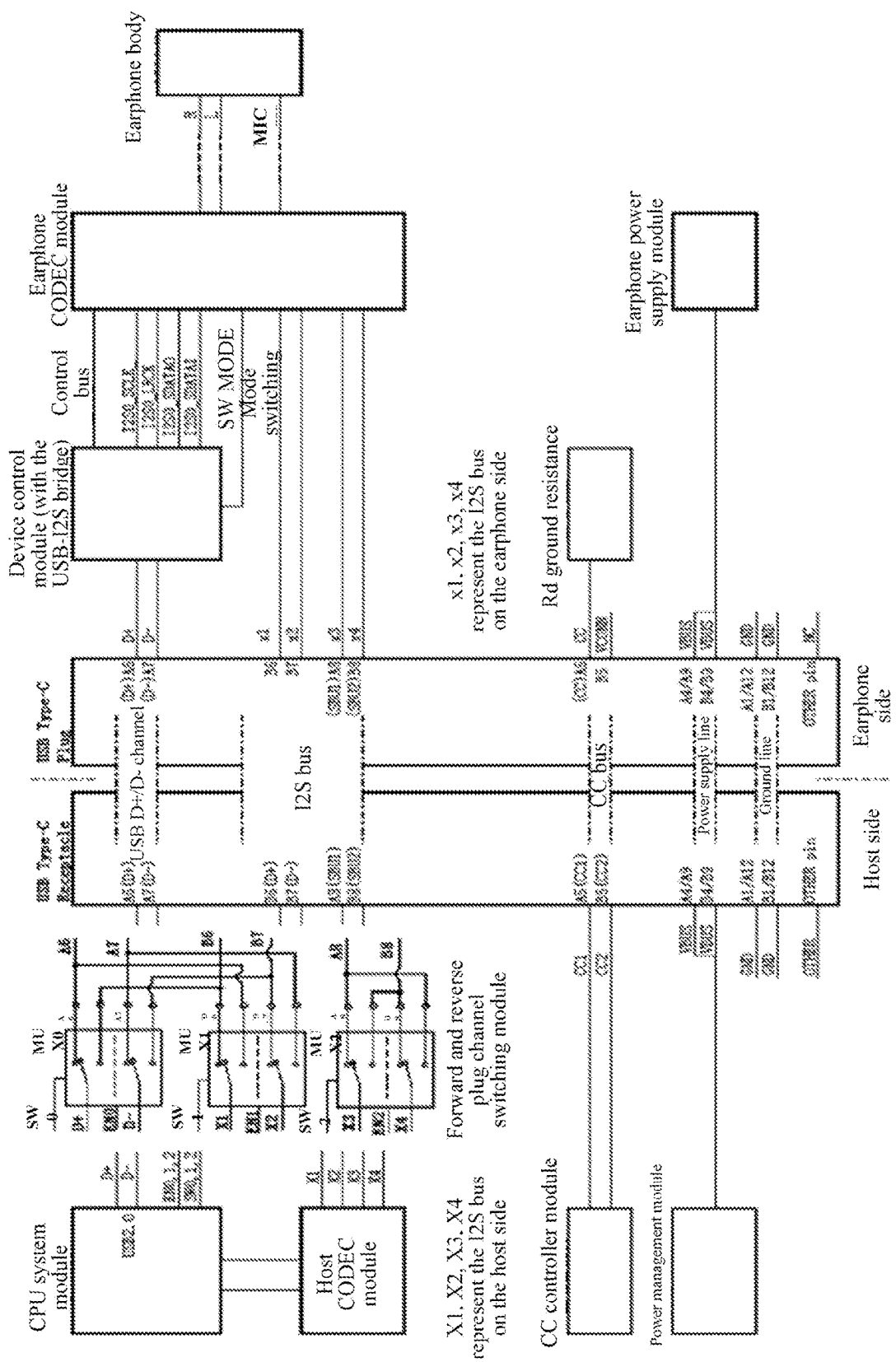
FIG. 14 is an architecture diagram of a dual-mode digital earphone based on I2S and UAC according to an embodiment of the present application.
Figure 15:
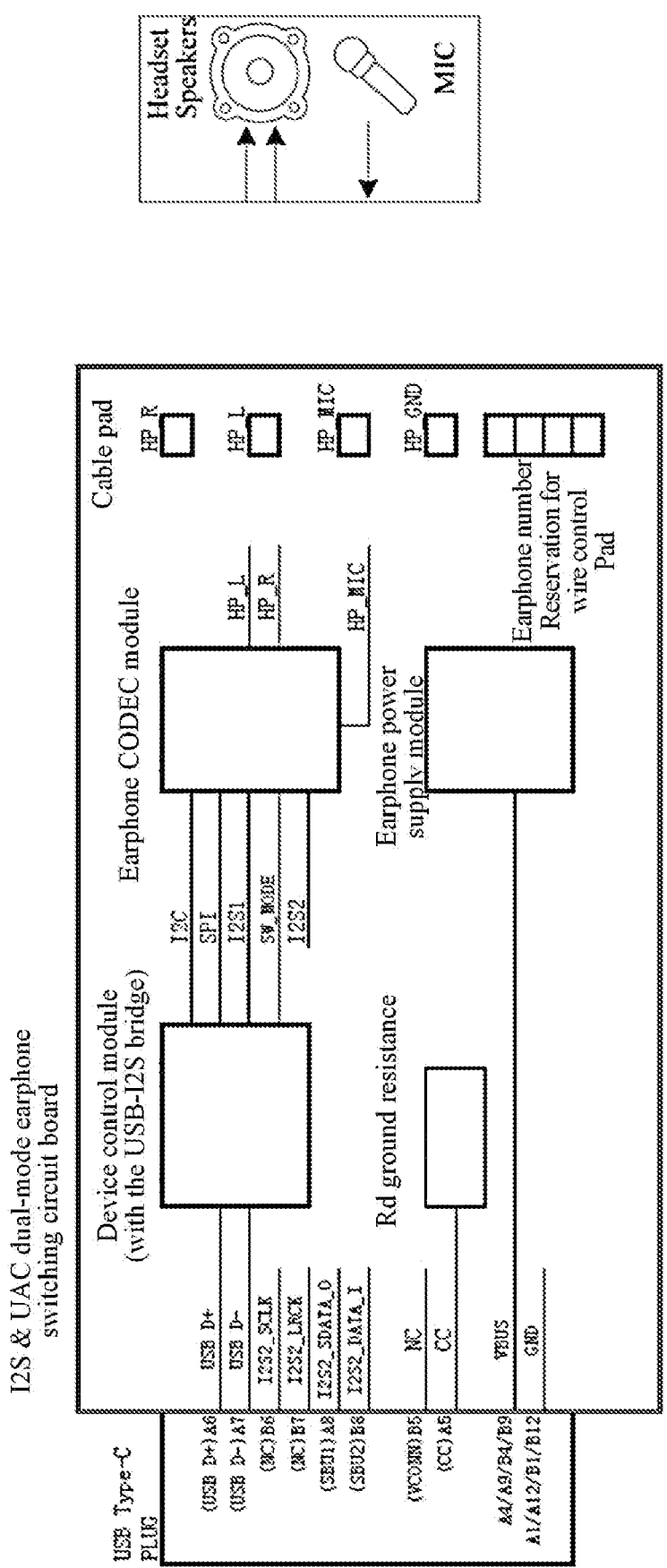
FIG. 15 is a schematic circuit diagram of a dual-mode digital earphone based on I2S and UAC according to an embodiment of the present application.

Implementation architecture of the I2S & UAC dual-mode earphone is show in FIG. 14. The circuit principle of the earphone is shown in FIG. 15. As shown in FIG. 14 and FIG. 15, The architecture of the I2S & UAC dual-mode earphone is formed by an earphone, a host, and an interaction signal channel between the host and the earphone. The earphone has two working modes: a working mode 1 and a working mode 2. In the working mode 1, i.e. the I2S USBC mode, the I2S is directly crossed over the USB Type-C interface to transmit the audio signals; in the working mode 2, i.e. the UAC mode, the I2S is packed into a USB data format (I2S Over USB) to transmit the audio signals. The control signals and data signals are transmitted through the USB D+/D− bus.

An earphone side part includes a device control module, an earphone CODEC module, an earphone power supply module, an earphone USB Type-C Plug, an Rd ground resistance and an earphone body.

A host side part not only includes a CPU system module and a host CODEC module, but also must include a CC controller module, a power supply management module, a forward and reverse plug channel switching module and a USB Receptacle.

Interaction signals between the host and the earphone include the USB bus, the I2S bus, the CC bus, the power supply line, and the common ground line. In this embodiment, it is assumed that x1/X1=I2S2_SCLK; x2/X2=I2S2_LRCK; x3/X3=I2S2_SDATA_O; x4/X4=I2S2_SDATA_I. It should be noted that pins of SDATA_O and SDATA_I of the I2S between a Master chip and a Slave chip should be cross-connected.

Functions of modules of the I2S & UAC dual-mode earphone are described below.

1) Device Control Module:

The device control module has a function of identifying basic information of the I2S & UAC earphone. The basic information includes that this is an I2S & UAC dual-mode earphone that supports the I2S USBC earphone mode and the UAC mode; the I2S bus is defined on the B6/B7/A8/B8 pins of the USB Type-C. The device control module communicates with the CPU system module on the host side through the USB D+/D− bus to complete report of earphone identification information and complete initialization of the earphone CODEC module. The device control module transmits audio upstream and downstream data by using the I2S bus, transmits control and status data by using the I2C bus, and transmits firmware data of the earphone CODEC module by using the SPI bus, with the earphone CODEC module. The device control module also completes a mode switching function of the I2S USBC earphone mode and the UAC mode.

2) Earphone Body

The earphone body includes an earphone horn, an MIC, wire control keys, an earphone cable and the like, that is all parts of a traditional 3.5 mm earphone except a plug.

3) Earphone Power Supply Module

The earphone power supply module acquires power from VBUS of the USB Type-C Plug, converts the power into voltages required by each module on the earphone side, and manages a power-on sequence.

4) Rd Ground Resistance

The Rd ground resistance identifies that this is a USB Device. The CC bus on the host side detects the ground resistance to complete plug identification of the earphone USB Device.

5) Earphone CODEC Module

The earphone CODEC module includes an audio I2S HUB, a CODEC, an MIC DAC, an earphone DAC, an earphone amplifier, earphone wire control identification and code, and the like, and has an I2C interface and dual I2S interfaces, where one I2S interface is directly connected to B6/B7/A8/B8 pins of the USB Type-C Plug, and another I2S interface is connected to an I2S interface of the device controller (with a USB-I2S bridge).

Figure 16:
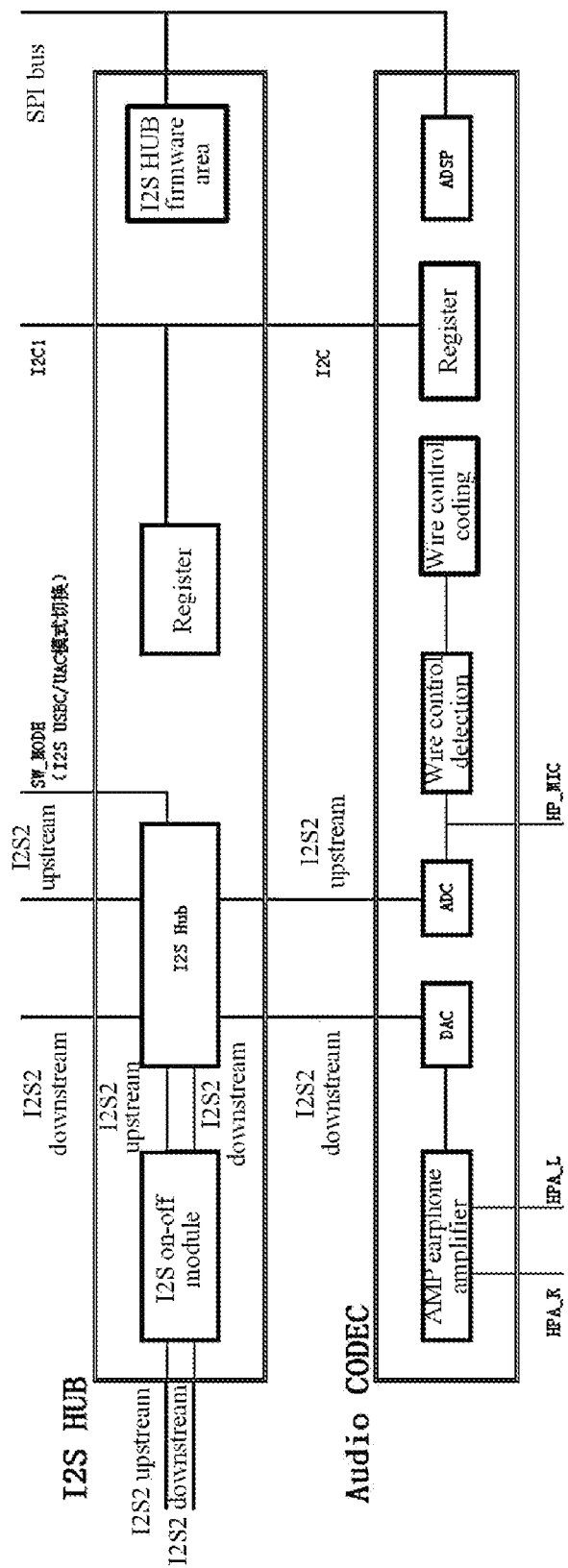
FIG. 16 is a block diagram of a CODEC module of a terminal according to an embodiment of the present disclosure.

A block diagram of the earphone CODEC module is shown in FIG. 16. In this embodiment, the I2S Hub in FIG. 16 can be implemented by using a low power consumption FPGA, and also can be implemented by using an Audio DSP. The I2S2 channel must have an I2S on-off module, which is on or off by default when powered on. Because A6 and B6 of a USB Type-C receptacle port of a general host are shorted, A7 and B7 are shorted, when the dual-mode earphone is plugged into the general host, pins A6 and B6, A7 and B7 of a USB Type-C plug port on the earphone side will be shorted from the host side.

A use flow of the I2S & UAC dual-mode earphone includes steps described below.

Figure 17:
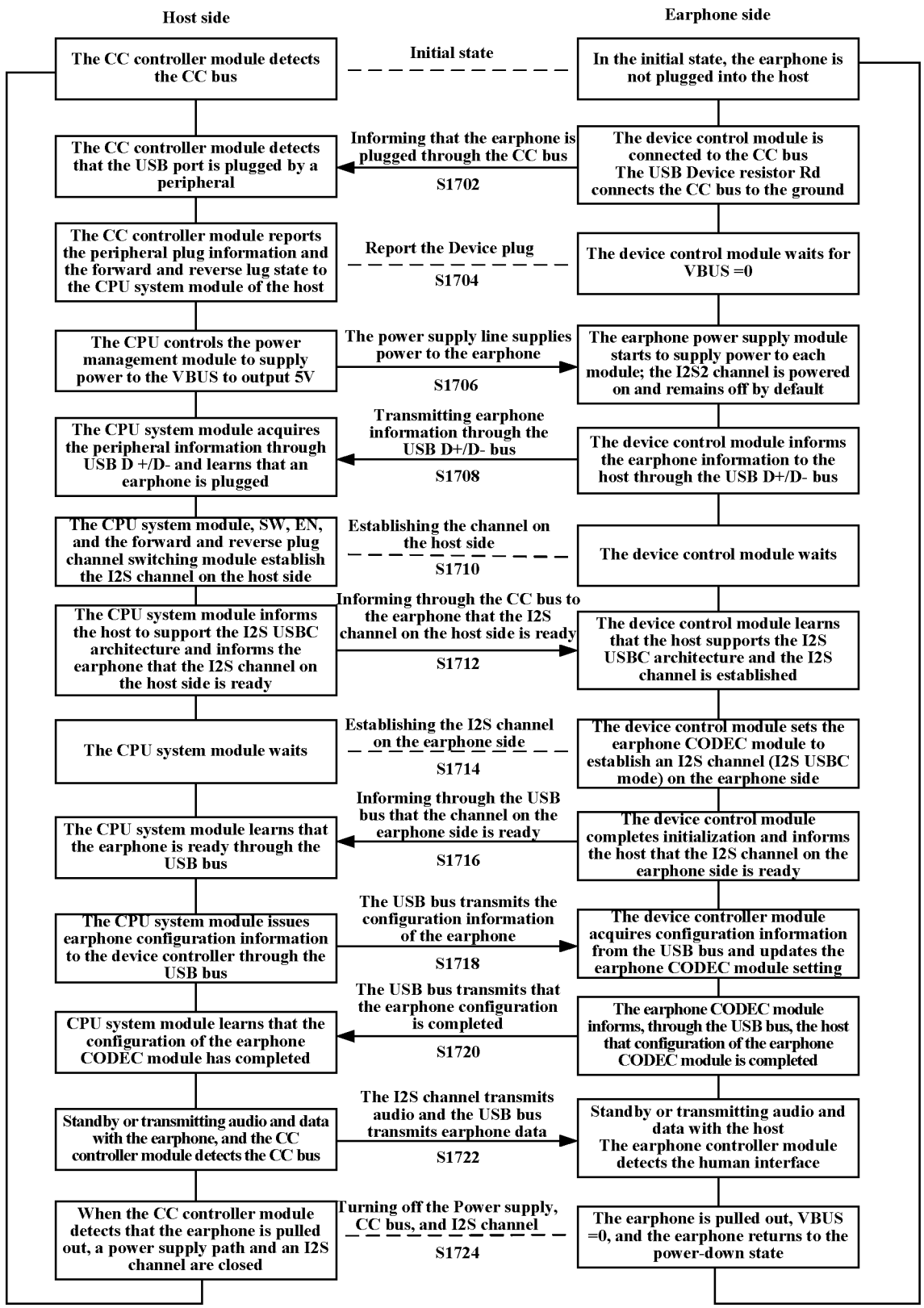
FIG. 17 is a flowchart illustrating an operation of an I2S USBC mode of a dual-mode earphone when a host supports an I2S Naked Over USB Type-C architecture according to an embodiment of the present application.

When the host meets the I2S Naked Over USB Type-C architecture, the earphone works in a mode 1, that is the I2S USBC mode. A work flow of the dual-mode earphone in the I2S USBC mode is shown in FIG. 17.

Figure 18:
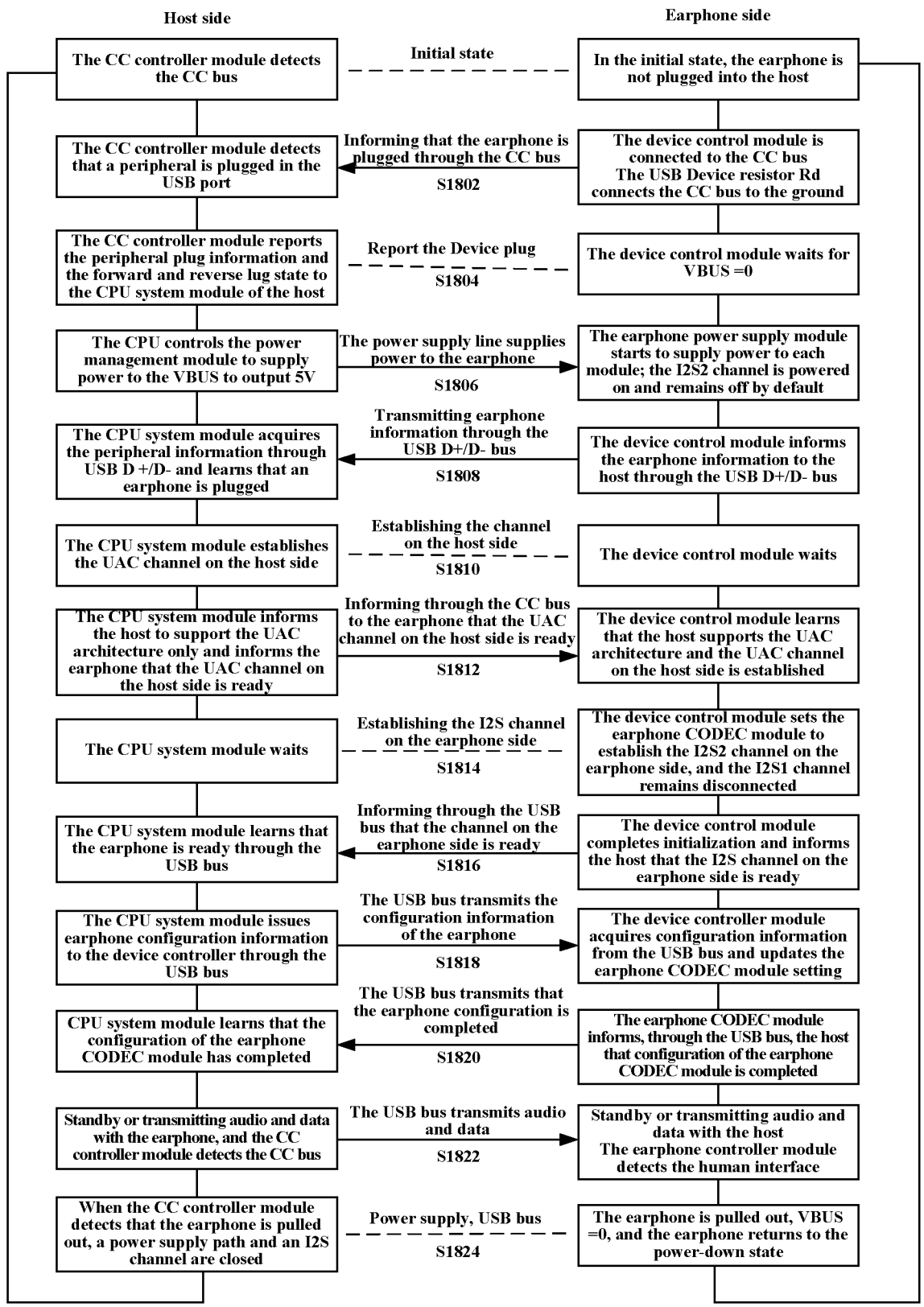
FIG. 18 is a flowchart illustrating an operation of a UAC mode of a dual-mode earphone when a host supports a UAC architecture according to an embodiment of the present application.

When the host does not meet the I2S Naked Over USB Type-C architecture and only meets the UAC architecture, the earphone works in the UAC mode. At this time, a work flow of the dual-mode earphone in the UAC mode is shown in FIG. 18.

Technical effects of the I2S & UAC dual-mode earphone are described below.

1) The I2S & UAC dual-mode earphone has good versatility, the I2S USBC mode is used when the host meets the I2S Naked Over USB Type-C architecture, and the UAC mode is used when the host only meets the UAC architecture.

2) When the I2S & UAC dual-mode earphone uses the I2S USBC mode, power consumption is low, and the I2S low power consumption digital audio bus is used for audio signal transmission; compared with UAC, power consumption waste of I2S to USB and USB to I2S and power consumption waste in a case that the AP cannot sleep when the USB works are further saved.

3) As for the I2S & UAC dual-mode earphone, the cost is low. 3) Compared with the analog-digital mixed earphone, a rear-stage circuit does not need to be added with a two-way earphone switching chip; compared with the analog-digital mixed earphone with time division multiplexing channels, a front-stage USB of a USB port and an earphone signal switch are further saved.

4) HIFI performance of the I2S & UAC dual-mode earphone is more guaranteed. Firstly, the pure digital signals are not easily interfered; and secondly, compared with the analog-digital mixed earphone, the rear-stage circuit does not need to be added with the two-way earphone switch, so that insertion loss of the audio signal caused by the switch is avoided. Compared with the analog-digital mixed earphone with time division multiplexing channels, the USB and the earphone signal switch are further saved, thereby further avoiding audio signal insertion loss caused by the switch.

5) When the I2S & UAC dual-mode earphone uses the I2S USBC mode, the time delay requirement of the mobile call can be completely met. An audio channel is completely the same as a traditional mobile phone, and natural call delay is the same as the traditional mobile phone.

6) As for the I2S & UAC dual-mode earphone, traditional audio architecture is used in software, the earphone development difficulty is relatively lower, a full digitalization process of the earphone is more advanced, and the product is easier to seize market opportunities. The design of the digital earphone which completely meets the requirement of the mobile call time delay under the pure UAC architecture needs to wait for improvement of the UAC standard and optimization of a host hardware platform and software architecture, and can be realized in the future.

Figure 19:
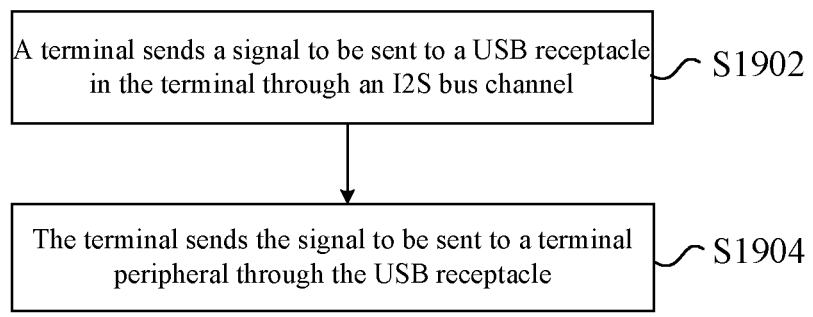
FIG. 19 is a flowchart of a signal sending method according to an embodiment of the present application.

This embodiment provides a signal transmission method, and FIG. 19 is a flowchart of a signal sending method according to an embodiment of the present application. As shown in FIG. 19, the method includes steps described below.

In step S1902, a terminal sends a signal to be sent to a USB receptacle in the terminal through an I2S bus channel, and in some embodiments, the USB receptacle is a USB Type-C receptacle.

In step S1904, the terminal sends the signal to be sent to a terminal peripheral through the USB receptacle.

From the description of the implementation modes above, it will be apparent to those skilled in the art that the method in the embodiments described above may be implemented by software plus a necessary general-purpose hardware platform, or may of course be implemented by hardware. However, in many cases, the former is more often used. Based on this understanding, the present application substantially, or the part contributing to the existing art, may be embodied in the form of a software product. The software product is stored on a storage medium (such as a ROM/RAM, a magnetic disk or an optical disk) and includes several instructions for enabling a terminal device (which may be a mobile phone, a computer, a server or a network device) to execute the method according to each embodiment of the present application.

Figure 20:
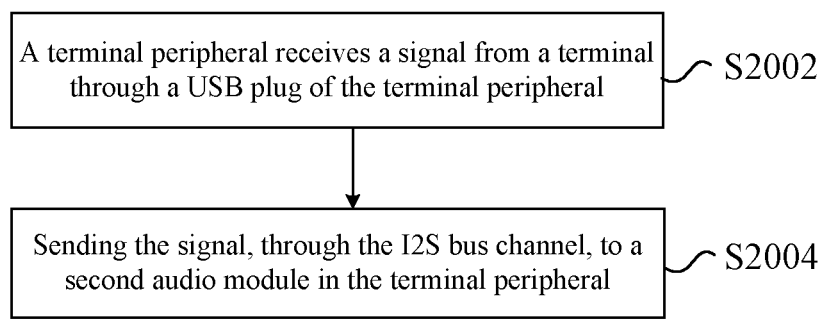
FIG. 20 is a flowchart of a signal receiving method according to an embodiment of the present application.

This embodiment provides a signal receiving method. As shown in FIG. 20, the method includes steps described below.

In step S2002, a terminal peripheral receives a signal from a terminal through a USB plug of the terminal peripheral, and in some embodiments, the USB plug is a USB Type-C plug.

In step S2004, through the I2S bus channel, the signal is sent to a second audio module in the terminal peripheral.

In an embodiment, before sending, through the I2S bus channel, the signal to the second audio module in the terminal peripheral, the terminal peripheral determines a working mode of the terminal; the I2s bus channel is conducted when the working mode is a first working mode, and the audio bus channel is closed and a USB channel between the second audio module and the USB plug is opened when the terminal supports a second working mode, where in the first working mode, a first audio module in the terminal is connected to a USB receptacle through the audio bus channel, and in the second working mode, the first audio module is connected to the USB receptacle through the USB channel.

Apparently, those skilled in the art should know that each of the above-mentioned modules or steps of the present application may be implemented by a general-purpose computing device, the modules or steps may be concentrated on a single computing device or distributed on a network formed by multiple computing devices, and in some embodiments, the modules or steps may be implemented by program codes executable by the computing devices, so that modules or steps may be stored in a storage device and executed by the computing devices. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any specific combination of hardware and software.

The above are only some embodiments of the present application and are not intended to limit the present application, and for those skilled in the art, the present application may have various modifications and variations. Any modifications, equivalent substitutions, improvements and the like made within the spirit and principle of the present application should fall within the scope of the present application.

What is claimed is:

1. A terminal, comprising:
   a first audio module, which is connected to a universal serial bus (USB) receptacle in the terminal through an audio bus channel and is configured to send a signal to the USB receptacle; and
   the USB receptacle, which is configured to provide a physical connection interface between the terminal and a terminal peripheral;
   wherein the terminal further comprises a Channel Configuration (CC) controller which is configured to identify a forward and reverse plug connection state in a case where the terminal peripheral is connected to the terminal and notify the forward and reverse plug connection state to a system module used for performing information interaction with a network side; and
   wherein the CC controller acquires a peripheral label and initializes a peripheral CODEC module through a CC bus.

2. The terminal of claim 1, wherein the USB receptacle is a USB Type-C receptacle.

3. The terminal of claim 1, further comprising: a forward and reverse plug channel switching module, which is connected to an inter-IC sound (I2S) bus and is separately connected to the first audio module and the USB receptacle through an audio bus.

4. The terminal of claim 3, further comprising:
a system module, which is separately connected to the first audio module and the forward and reverse plug channel switching module and is configured to, according to a forward and reverse plug connection state when the terminal peripheral accesses to the terminal, control the forward and reverse plug channel switching module to establish the audio bus channel.

5. The terminal of claim 2, wherein the audio bus is an I2S bus; an I2S bus in an I2S bus channel is connected to pins B6, B7, A8 and B8 in the USB Type-C receptacle over the forward and reverse plug channel switching module.

6. A terminal peripheral, comprising:
a second audio module, which is connected to a universal serial bus (USB) plug in a terminal peripheral through an audio bus channel and is configured to perform signal transmission with the USB plug through an inter-IC sound (I2S) bus channel;
a device control module, which is connected to a USB Type-C plug and used for maintaining description information of the terminal peripheral, wherein the description information comprises at least one of: identification information used for identifying that the terminal peripheral supports a connection of the second audio module to the USB Type-C plug through an audio bus channel; or a mapping relationship between an audio bus in the audio bus channel and pins of the USB Type-C plug; and
the USB plug, is configured to be connected to a USB receptacle of a terminal accessed by the terminal peripheral;
wherein the USB plug is the USB Type-C plug and the device control module is further configured to be connected to the second audio module through an I2C bus and used for initializing configuration of the second audio module.

7. The terminal peripheral of claim 6, wherein the device control module is further configured to control the second audio module to establish the audio bus channel and send first notification information to the terminal, and the first notification information is used for notifying the terminal that the terminal peripheral has established the audio bus channel.

8. The terminal peripheral of claim 7, wherein the device control module is further configured to receive second notification information sent by the terminal, the second notification information is used for notifying the terminal peripheral that the terminal has established the I2S bus channel.

9. The terminal peripheral of claim 6, wherein the audio bus is an I2S bus; an I2S in the I2S bus channel is connected to pins B6, B7, A8 and B8 of the USB Type-C plug; or the I2S is connected to pins A6, A7, A8 and B8 of the USB Type-C plug; or the I2S is connected to pins A6, A7, B6 and B7 of the USB Type-C plug;

wherein the I2S comprises the following signal lines: serial bit clock SCLK, frame clock LRCK, serial out data SDATA_O, and serial in data SDATA_I.

10. The terminal peripheral of claim 6, further comprising:
a switching module, which is configured to open the I2S bus channel when the terminal supports a first working mode, and close the I2S bus channel and open a USB channel between the second audio module and the USB plug when the terminal supports a second working mode, the USB channel includes a USB-to-I2S bridge circuit, wherein in the first working mode, a first audio module in the terminal is connected to a USB receptacle through the I2S bus channel, and in the second working mode, the first audio module is connected to the USB receptacle through the USB channel.

11. A signal sending method, comprising:
sending, by a terminal, a signal to be sent to a USB receptacle in the terminal through an audio bus channel, and sending the signal to be sent to a terminal peripheral through the USB receptacle;
wherein the terminal further comprises a Channel Configuration (CC) controller which is configured to identify a forward and reverse plug connection state in a case where the terminal peripheral is connected to the terminal and notify the forward and reverse plug connection state to a system module used for performing information interaction with a network side; and
wherein the CC controller acquires a peripheral label and initializes a peripheral CODEC module through a CC bus.

12. The method of claim 11, wherein the USB receptacle is a USB Type-C receptacle.

13. A signal receiving method, applied to the terminal peripheral of claim 6, comprising:
receiving, by a terminal peripheral, a signal from a terminal through a universal serial bus (USB) plug of the terminal peripheral, and sending, through an audio bus channel, the signal to a second audio module in the terminal peripheral.

14. The signal receiving method of claim 13, wherein the USB plug is a USB Type-C plug.

15. The signal receiving method of claim 14, wherein before sending, through the audio bus channel, the signal to the second audio module in the terminal peripheral, the method further comprises:
determining, by the terminal peripheral, a working mode of the terminal; and
conducting the audio bus channel when the working mode is a first working mode, and closing the audio bus channel and opening a USB channel between the second audio module and the USB plug when the terminal supports a second working mode; wherein in the first working mode, a first audio module in the terminal is connected to a USB receptacle through an audio bus channel in the terminal, and in the second working mode, the first audio module is connected to the USB receptacle through a USB channel in the terminal.

* * * * *